UNITED STATES PATENT OFFICE.

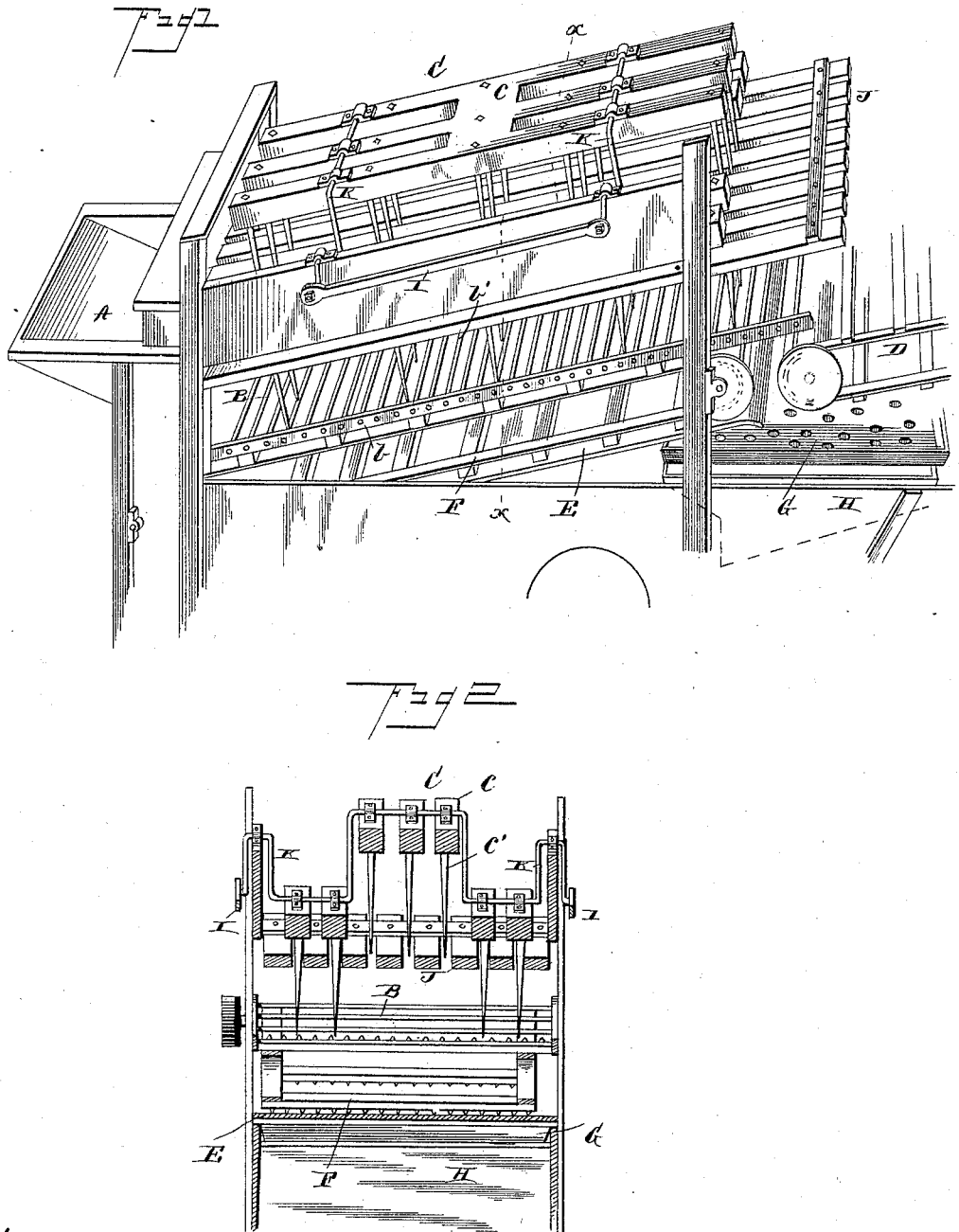

SIDNEY E. CHASE, OF WOLCOTTVILLE, INDIANA.

GRAIN-SEPARATOR.

SPECIFICATION forming part of Letters Patent No. 432,117, dated July 15, 1890.

Application filed January 24, 1889. Serial No. 297,477. (No model.)

*To all whom it may concern:*

Be it known that I, SIDNEY E. CHASE, a citizen of the United States, residing at Wolcottville, in the county of La Grange and State of Indiana, have invented certain new and useful Improvements in Grain-Separators for Thrashing-Machines, of which the following is an accurate description, reference being made to the accompanying drawings, and to the letters of reference marked thereon, which form a part of this specification.

My invention relates to improvements in grain-separators that are used in thrashing, separating, and cleaning grain and seeds at one operation; and the object of my improvement is to produce a separator that will more thoroughly separate the grain and seed from the straw without carrying over and wasting. I attain these objects by the mechanism illustrated in the accompanying drawings, in which—

Figure 1 is a perspective view of a grain-separator provided with my improvements, and Fig. 2 is a vertical transverse section of the same.

Referring to the drawings by letter, B designates a grate or screen, consisting of the side bars $b$ and the transverse rods $b'$, secured between said side bars. This screen extends in an inclined position from the concave A below and in rear of the thrashing-cylinder to the riddle D.

Above the screen B, I arrange a series of longitudinal guards J, which prevent the straw passing upward, so as to accumulate on the walking-rake and interfere with the operation of the same.

The overhung rake C is composed of a series of longitudinally-arranged rake-heads $c$, which have the teeth $c'$ depending from their under sides through the spaces between the guards J nearly to the screen B. The rake-heads are mounted on the transverse crank-shafts K K, which are journaled upon the frame of the machine and are joined by the connecting-bar I, so as to be operated uniformly.

Below the screen B the machine is provided with an inclined floor E, and between this floor and the said screen I arrange an endless rake F, as shown, and a vibrating screen G is arranged below the end of the floor E and riddle D and over the cleaning-mill H.

The straw and thrashed grain are thrown by the thrashing-cylinder onto the screen B below in rear of the thrasher and carried by the teeth of the overhung rake over the said screen, whereby the grain is separated and drops through between the cross-bars $b'$ in the screen onto the floor or bottom E, and is carried by a revolving rake F back and deposited on the screen G, which is hung immediately over the cleaning-mill H. After the straw leaves the screen B it is carried back and out of the machine by the riddle-belt D, or its equivalent, which may be a vibrating pan or any other device for taking away the straw. The rake-heads C are connected by two crank-shafts K K, formed so as to put part of the bars on the outside divisions and part on the center division, so that they will be balanced, said shafts being also connected by the bar I, or its equivalent, to give the crank-shafts a uniform motion. The cranks are driven by a belt on one end of one of the shafts, and the bar I keeps them in the same line. At a proper distance above the screen B, I place guards J, which are for the purpose of preventing the straw from being thrown up among the bars C by the thrashing-cylinder or from any other cause, said guards running over the whole length of the screen and being placed so that the teeth will work down between them and carry the straw backward to the riddle D. The screen G is independent from any other device for carrying the separated grain back to the fanning-mill, and is arranged to shake by any proper device, letting the grain and chaff down through the perforated bottom onto the sieves below, separating the short straw, weeds, and any other coarse matter there might be, and carrying them over at the rear end.

I am aware that machines are constructed using a screen that is hinged or fastened to the vibrating pan or shaker that carries the separated grain from the cylinder back to the fanning-mill, and some are made part of the conveyer, while mine is entirely independent and receives the grain as it drops down from the conveying-floor E as it is moved back by the open rake F. There are also machines using a single crank-shaft which have fork-heads attached, in which teeth are placed that throw the straw over a curved screen and deposit it onto a set of beaters, and it is then thrown onto a shaking-pan and over other beaters onto the riddle, while I use two crank-shafts and the screen is straight and the teeth or forks throw the straw direct onto the riddle, thereby using a longer screen and double the separating-room over the screen, and doing away with the beaters and vibrating pan, thereby using less machinery to accomplish the same object.

What I claim as my invention, and desire to secure by Letters Patent, is—

The combination, in a grain-separator, of a stationary screen extending upwardly and rearwardly from the concave, a walking-rake arranged above said screen, the longitudinal guards arranged between said screen and the rake-heads, an endless carrier to convey the grain and chaff passing through the stationary screen to the shaking-screen, and an endless carrier arranged above the latter to convey the straw passing over the stationary screen to the tail end of the machine, substantially as set forth.

SIDNEY E. CHASE.

Witnesses:
J. W. BISHOP,
W. B. HALL.